(12) United States Patent
Chen et al.

(10) Patent No.: US 6,251,971 B1
(45) Date of Patent: Jun. 26, 2001

(54) THERMAL INSULATION COATING FOR PIPES

(75) Inventors: Chaofeng Chen; Paul Titus, both of Houston, TX (US)

(73) Assignee: Power Lone Star, Inc., Highland Ranch, CO (US)

( * ) Notice: Subject to any disclaimer, the term of this patent is extended or adjusted under 35 U.S.C. 154(b) by 0 days.

(21) Appl. No.: 09/364,564

(22) Filed: Jul. 30, 1999

Related U.S. Application Data

(60) Provisional application No. 60/094,862, filed on Jul. 31, 1998.

(51) Int. Cl.[7] ....................................................... C08J 9/32
(52) U.S. Cl. .......................... 523/218; 523/219; 523/401
(58) Field of Search ..................................... 523/401, 218, 523/219

(56) References Cited

U.S. PATENT DOCUMENTS 4,644,014 * 2/1987 Thomson et al. ...................... 521/68
5,464,886 * 11/1995 Tran et al. ............................ 523/428

FOREIGN PATENT DOCUMENTS 50-014722 * 2/1975 (JP) .

* cited by examiner

*Primary Examiner*—Robert Dawson
*Assistant Examiner*—D. Aylward
(74) *Attorney, Agent, or Firm*—Jenkens & Gilchrist

(57) ABSTRACT

The thermal insulating material of the present invention allows for the use of microballoons as an insulating material for the exterior surface of pipes. In the present invention, microballoons are mixed with a water based epoxy while in its liquid state. To absorb the water from the water based epoxy, cement is added to the mixture. The mixture of water based epoxy, microballoons and cement is then extruded or thrown onto the exterior surface of pipes.

1 Claim, No Drawings

THERMAL INSULATION COATING FOR PIPES

This application claims the benefit of U.S. Provisional Patent Application Ser. No. 60/094,862 filed Jul. 31, 1998.

FIELD

The present invention pertains to external coatings for pipes; more particularly, the present invention pertains to external thermal insulation coatings for pipes.

BACKGROUND

It is well known that pipe clogging solids are produced if hot hydrocarbons are cooled as they flow out of hydrocarbon reservoirs. This is a particular problem in the production of hydrocarbons from offshore wells because the hydrocarbons are immediately subjected to the seawater temperatures if they pass through uninsulated pipes located near the ocean bottom. Specifically, cooled hydrocarbons form hydrate solids which can significantly reduce the internal flow diameters of production piping. Accordingly, there is a need in the art to provide a low cost, effective thermal insulation material for the external coating of pipes used in the subsea production of hydrocarbons. Such thermal insulation material should have sufficient strength and compressibility to withstand the rough handling of pipe normally associated with the production of hydrocarbons.

Some users of pipe to produce hydrocarbons from subsea wells have tried using thermoplastics such as polypropylene or polyethylene for thermal insulation. While effective for retaining heat, it has been found that such thermoplastics are difficult to apply to the external surface of pipes.

One of the best thermal insulating materials developed in recent years is the microballoon; however, heretofore there have been no method or systems in which microballoons can be effectively applied as thermal insulation to the exterior surface of pipes for use in hostile environments such as in the subsea production of hydrocarbons.

It has been proposed to use oil based epoxies to form a matrix to support the microballoons; however, such oil based epoxies are difficult to apply to the exterior of pipes and are notorious for making application equipment hard to clean.

The need, therefore, remains in the art for a system which will allow for the use of microballoons as a thermal insulating material for the exterior surface of pipes.

SUMMARY

The thermal insulating material of the present invention allows for the use of microballoons as an insulating material for the exterior surface of pipes.

In the present invention, microballoons are mixed with a water based epoxy while in its liquid state. To absorb the water from the water based epoxy, cement is added to the mixture. The mixture of water based epoxy, microballoons and cement is then extruded or thrown onto the exterior surface of pipes.

ADVANTAGES OF THE INVENTION

The mixture of water based epoxy, microballoons and cement of the present invention has shown that it provides the desired qualities of a low thermal conductivity, high compressive strength and good wear resistance. Interestingly, the proportion of cement to the other ingredients is not particularly critical as the continued absorption of water by the cement improves the invention.

Testing has revealed that the insulation of the present invention is suitable for in high temperature situations.

DESCRIPTION OF THE EMBODIMENTS

While the present invention including microballoons, water based epoxy and cement can be applied to bare pipe, it may also be applied to pipes which have been first coated with a fusion bonded epoxy inner corrosion layer.

In the preferred embodiment the middle or thermal insulation layer using the mixture of the present invention is coated with an outer protective layer after being applied over the inner corrosion layer. While the middle or thermal insulating layer of water based epoxy, formed from a water based resin and a water base hardener, microballoons and cement is brittle and subject to cracking when the coated pipe is bent, there is no danger of corrosive fluids contacting the outer surface of the pipe because of the protection provided by the inner corrosive layer.

If desired, a heating coil may be imbedded in the insulating layer just over the inner corrosion layer. If the insulating material of the present invention is to be used with equipment typically associated with pipes such as elbows, tees, or valves, the mixture of water based epoxy, microballoons and cement may be cast into predetermined shaped and simply banded on to the equipment typically associated with pipes or it may be thrown onto the equipment and allowed to harden.

We claim:

1. A thermal insulation coating to be applied to the exterior of pipes to retain heat therein, said thermal insulation comprising:

a water based epoxy resin;

a water based epoxy hardener;

micro balloons; and a sufficient amount of water setable or hydraulic cement powder to absorb water from said water based epoxy resin and said water based epoxy hardener.

* * * * *